US012737099B2

(12) United States Patent
Pliquett et al.

(10) Patent No.: US 12,737,099 B2
(45) Date of Patent: Sep. 15, 2026

(54) DEVICE AND METHOD FOR EMPHASIZING THE RELATION OF USER INTERFACE SECTIONS

(71) Applicant: Rohde & Schwarz GmbH & Co. KG, Munich (DE)

(72) Inventors: Jochen Pliquett, Glonn (DE); Luke Cirillo, Poing (DE); Bastian Bunsen, Graefelfing (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 18/347,238

(22) Filed: Jul. 5, 2023

(65) Prior Publication Data

US 2024/0103703 A1 Mar. 28, 2024

(30) Foreign Application Priority Data

Sep. 22, 2022 (EP) .................................... 22197018

(51) Int. Cl.
*G06F 3/04845* (2022.01)
*G06F 3/04842* (2022.01)

(52) U.S. Cl.
CPC ...... *G06F 3/04845* (2013.01); *G06F 3/04842* (2013.01)

(58) Field of Classification Search
CPC ............. G06F 3/04845; G06F 3/04842; G06F 3/04847; G06F 2203/04803; G06F 2203/04806; G06F 9/451; G01R 13/029; G01R 1/025
See application file for complete search history.

(56) References Cited

U.S. PATENT DOCUMENTS

| | | | | |
|---|---|---|---|---|
| 9,189,251 | B2 * | 11/2015 | Liu | G06F 3/0481 |
| 10,783,214 | B1 * | 9/2020 | Rowe | G06F 16/904 |
| 2004/0204886 | A1 * | 10/2004 | Rieger | G01R 1/025 702/104 |
| 2008/0066013 | A1 | 3/2008 | Brodersen et al. | |
| 2008/0168385 | A1 * | 7/2008 | Duarte | G06F 3/0485 715/784 |
| 2009/0019031 | A1 | 1/2009 | Krovitz et al. | |

(Continued)

FOREIGN PATENT DOCUMENTS

| | | | | |
|---|---|---|---|---|
| DE | 102014203346 | A1 * | 8/2015 | G06F 3/0481 |
| DE | 102008017289 | B4 * | 10/2021 | G01R 1/025 |

(Continued)

OTHER PUBLICATIONS

Extended European Search Report issued in EP22197018.9-1203 by the European Patent Office on Mar. 14, 2023.

*Primary Examiner* — Rashawn N Tillery
(74) *Attorney, Agent, or Firm* — Studebaker Brackett PLLC

(57) ABSTRACT

A device for emphasizing the relation of user interface sections comprises a first user interface section and a second user interface section. The first user interface section and the second user interface section are configured to display at least one of: an instrument parameter, a measurement result, a waveform. The device is configured to de-focus the second user interface section with respect to the first user interface section based on the selection of an instrument parameter in the first user interface section.

13 Claims, 4 Drawing Sheets

(56) References Cited

U.S. PATENT DOCUMENTS

2010/0141657 A1* 6/2010 Gamper .......... G01R 31/31912 345/440.1
2011/0047502 A1 2/2011 Schmidt et al.
2014/0168053 A1* 6/2014 Bergsieker ............ G01R 1/025 345/156
2015/0160162 A1* 6/2015 Darland .............. H01J 49/0036 250/281
2016/0216875 A1* 7/2016 Soo ........................ H02J 3/00
2017/0102866 A1* 4/2017 Calvillo ............. G06Q 30/0251
2018/0203220 A1* 7/2018 Hulsken ................ H04N 23/45
2020/0121199 A1* 4/2020 Freeman .............. A61B 5/4875
2020/0230336 A1* 7/2020 Angelico ............ A61M 16/024
2020/0409512 A1* 12/2020 Jing ..................... G06F 3/0481
2022/0091722 A1* 3/2022 Faulkner ................ G06F 3/017

FOREIGN PATENT DOCUMENTS

EP 2 518 646 A2 10/2012
EP 3 385 829 A1 10/2018
JP 2008298553 A * 12/2008
WO 2015/188036 A1 12/2015
WO WO-2019112672 A1 * 6/2019 .......... G06F 16/178

* cited by examiner

400

DEVICE AND METHOD FOR EMPHASIZING THE RELATION OF USER INTERFACE SECTIONS

FIELD OF THE INVENTION

The invention relates to emphasizing the relation of user interface sections. More specifically, the invention distinguishes the correspondence of a first user interface section for receiving an input parameter and a second user interface section for showing a measurement result which is influenced by the input parameter.

TECHNICAL BACKGROUND

On a conventional device (e.g., a measurement device, such as an oscilloscope or a signal analyzer) an input dialog is visible on a screen of the device. The input dialog may appear in a foreground of the screen (e.g., in a window), wherein the background (e.g., the entire screen) may contain several result representations. In other words, a first user interface section comprises the input dialog, and a second user interface section comprises the result representation. That is, both the first and the second user interface section can be regarded a graphical user interface (GUI) element.

Conventional devices divide the screen into several (typically rectangular) areas that may contain a wide variety of result representations (e.g., measurement results, wave forms, curves, tables, status information, 3D diagrams). The results can be provided by different sources, e.g. (measurement) applications, and can have different as well as common settings or parameters. If an application only can use a small area of the screen, the size of the input dialog or the result representation is limited to such a small area.

If an input dialog (e.g., for entering settings or parameters which affect a result representation) is shown, e.g., in the foreground/focus of the screen, it is not easy for a user to see to which result representation this input dialog belongs. If the user changes a certain parameter, it is difficult to see, which result representation is affect by that change.

That is, conventional devices fail to highlight, which result representation belongs to an input dialog, in particular on small or crowded screens.

SUMMARY OF THE INVENTION

Against this background, the object of the present invention is to emphasize the relation of user interface sections.

The present invention in particular allows for distinguishing, which user interface sections are related or not related to each other. In particular, the present invention highlights which result representation corresponds with an input dialog.

The invention is set out in the appended set of claims. The object is solved by the features of the independent claims. The dependent claims contain further developments.

An inventive device for emphasizing the relation of user interface sections comprises a first user interface section and a second user interface section, wherein the first user interface section and the second user interface section are configured to display at least one of an instrument parameter, a measurement result, a waveform, and wherein the device is configured to de-focus the second user interface section with respect to the first user interface section based on the selection of an instrument parameter in the first user interface section.

This ensures, that the second user interface section is highlighted compared to other user interface sections of the device. The relationship between input dialogs or parameters on the screen to other (result) areas is immediately recognizable. Input dialogues can be displayed or can become larger. Input dialogues, provided that they do not make up the entire screen, can be freely positioned by a user, e.g., to better recognize the reference to the second user interface section (i.e. the display of results). There can be several relevant and irrelevant user interface sections.

In particular, to de-focus comprises to prevent a user from focusing their gaze on the respective interface section.

In particular, the selection of an instrument parameter in the first user interface section may comprise to select, by the device, the instrument parameter to be displayed in the first user interface section, and/or to select, by a user, the instrument parameter which is displayed in the first user interface section. The selection done by the user in particular comprises clicking.

In particular, the first user interface section and/or the second user interface section are configured for input and output.

In particular, the first user interface section and/or the second user interface section comprise a display.

In particular, the first user interface section and/or the second user interface section are comprised by a same display.

In particular, the first user interface section and/or the second user interface section comprise a touch screen display.

In particular, the device comprises an instrument, e.g., a measurement device.

In particular, if the first user interface section is hidden or closed, de-focusing of the second user interface section is canceled.

In particular, the first user interface section overlaps with at least one other user interface section.

In particular, the first user interface section does not overlap with any other user interface section.

Advantageously and preferably, the device is further configured to blur the second user interface section to de-focus the second user interface section.

This provides an effective way of de-focusing the second user interface section.

In particular, the device is further configured to show a colored overlay on the second user interface section to de-focus the second user interface section. E.g., the colored overlay is a semitransparent grey overlay or a semitransparent overlay of any color.

Advantageously and preferably, the device is further configured to reduce the size of the second user interface section to de-focus the second user interface section.

This provides another effective way of de-focusing the second user interface section.

Advantageously and preferably, the device further comprises a third user interface section, wherein the device is in particular configured to increase the size of the third user interface section to de-focus the second user interface section.

This ensures that other user interface sections which relate to the parameters which are altered in the first user interface section can be increased, thus, they have more space for displaying information.

Advantageously and preferably, the device further comprises a fourth user interface section, wherein the device is in particular configured to increase the size of the fourth user interface section to de-focus the second user interface section.

This ensures that complex scenarios may be displayed by the device.

Advantageously and preferably, at least two of the user interface sections are non-rectangular user interface sections.

This ensures that even more complex scenarios can be displayed.

Advantageously and preferably, the device is further configured to de-focus the second user interface section displaying a measurement result with respect to the first user interface section displaying an instrument parameter based on the selection of the instrument parameter in the first user interface section.

This ensures that the case in which the first user interface section displays an instrument parameter and the second user interface section displays a measurement parameter is precisely covered.

An inventive method for emphasizing the relation of user interface sections comprises the steps of displaying, by a first user interface section of a device and a second user interface section of the device, at least one of an instrument parameter, a measurement result, a waveform; and de-focusing, by the device, the second user interface section with respect to the first user interface section based on the selection of an instrument parameter in the first user interface section.

Advantageously and preferably, the method further comprises the step of blurring, by the device, the second user interface section, to de-focus the second user interface section.

Advantageously and preferably, the method further comprises the step of reducing, by the device, the size of the second user interface section to de-focus the second user interface section.

Advantageously and preferably, the device further comprises a third user interface section, and the method in particular comprises the step of increasing, by the device, the size of the third user interface section to de-focus the second user interface section.

Advantageously and preferably, the device further comprises a fourth user interface section, and the method in particular comprises the step of increasing, by the device, the size of the fourth user interface section to de-focus the second user interface section.

Advantageously and preferably, at least two of the user interface sections are non-rectangular user interface sections.

Advantageously and preferably, the method further comprises the step of de-focusing, by the device, the second user interface section displaying a measurement result with respect to the first user interface section displaying an instrument parameter based on the selection of the instrument parameter in the first user interface section.

The inventive method comprises the same advantages as the inventive device.

An inventive computer program comprises instructions which, when the program is executed by a computer, cause the computer to carry out the inventive method.

The inventive computer program product comprises the same advantages as the inventive device.

An exemplary embodiment of the invention is now further explained with respect to the drawings by way of examples only, in which FIG. 1 shows a schematic view of a device according to an embodiment of the present invention;

DETAILED DESCRIPTION

In the following, structure and function of embodiments of the inventive device are going to be described based on FIG. 1, FIG. 2 and FIG. 3. Then, based on FIG. 4, the function of an embodiment of the inventive method is described.

Figure 1:
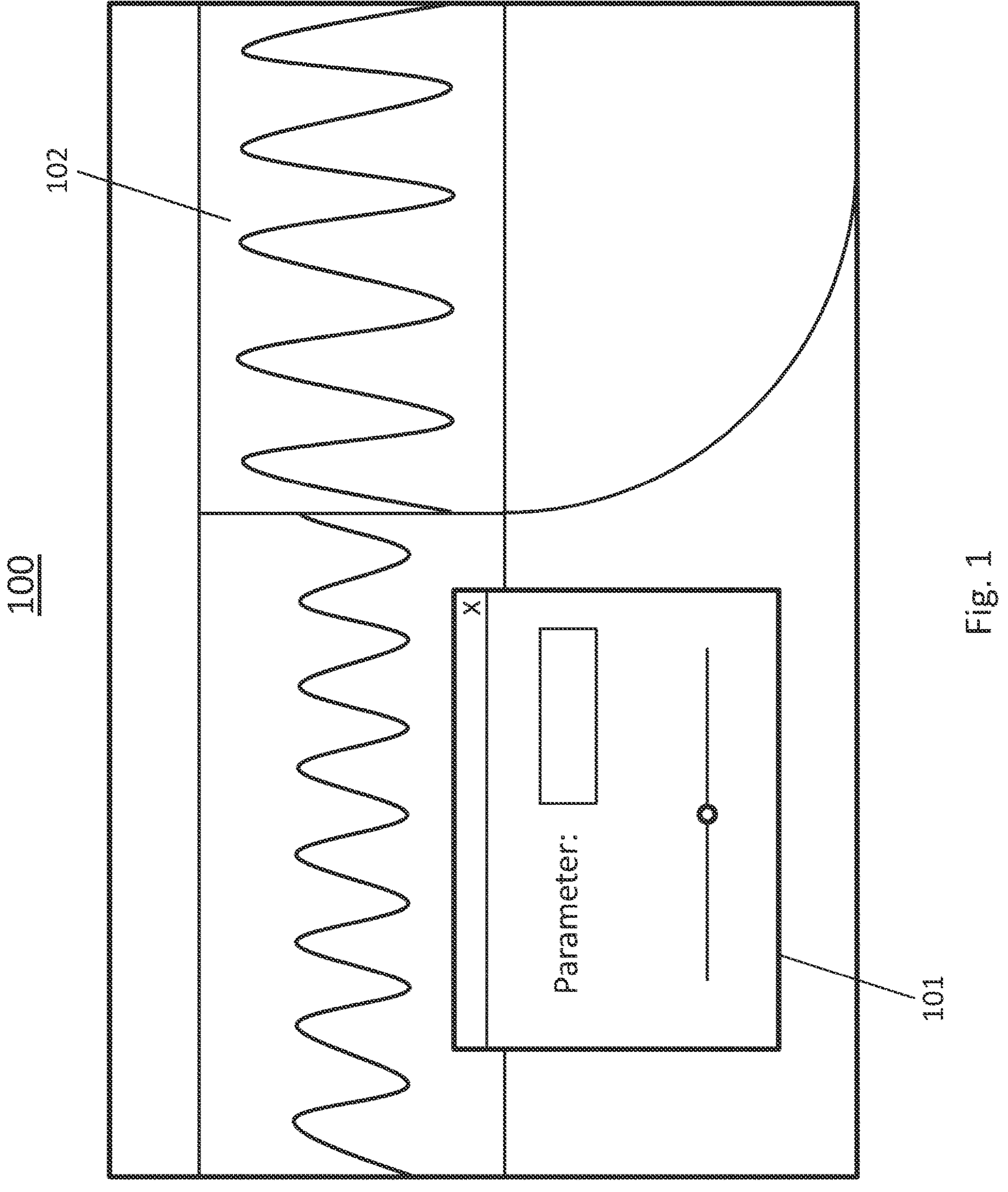

FIG. 1 shows a schematic illustration of an embodiment of the inventive device 100. The device 100 is for emphasizing the relation of user interface sections 101, 102 and can be any kind of device 100 with a user interface, such as a display or a touch screen display. The device 100 in particular can be a measurement device. The device 100 in particular can be an oscilloscope or a signal analyzer.

As illustrated in FIG. 1, the device 100 comprises a first user interface section 101 and a second user interface section 102. The first user interface section 101 and the second user interface section 102 are configured to display at least one of: an instrument parameter, a measurement result, a waveform. That is, an interface section 101, 102 may act as an input dialog, which can display and/or receive an instrument parameter. An interface section 101, 102 may also act as an output dialog, which is for result representation, that is, for displaying e.g., a measurement result, a waveform or a calculation result, obtained by the device 100.

The device 100 is configured to de-focus the second user interface section 102 with respect to the first user interface section 101 based on the selection of an instrument parameter in the first user interface section 101.

That is, if an instrument parameter in the first user interface section 101 is displayed, selected, or input, the second user interface section 102, which shows a measurement result or a waveform that is not affected by the instrument parameter, is de-focused.

Figure 2:
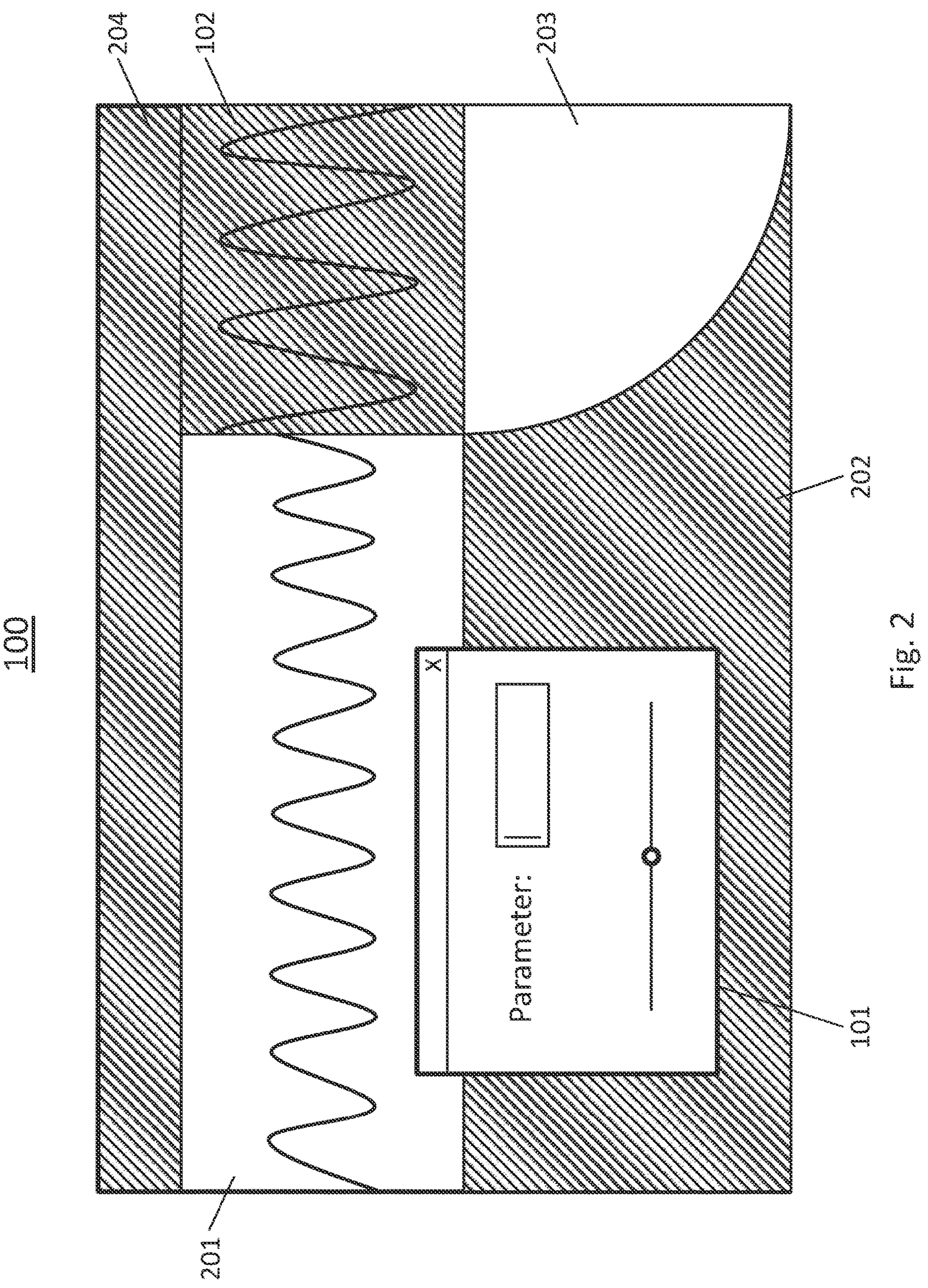
FIG. 2 shows a schematic view of a device according to an embodiment of the present invention in more detail.

The device 100 is now going to be described in more detail in view of FIG. 2. The device 100 of FIG. 2 includes all functions and features of the device 100 as described in view of FIG. 1.

As it is shown in FIG. 2, the device 100 optionally is configured to blur the second user interface section 102 to de-focus the second user interface section 102. By blurring the second user interface section 102, the user more easily focusses on another user interface section, e.g., the third user interface section 201 shown in the figure. The third user interface section 201 may relate to the parameter which is input in the first user interface section 101. Hatched areas in FIG. 2 mean that what is displayed underneath is blurred (e.g., by means of "Gaussian Blur") or overlaid by a transparent colored (e.g., gray) layer. Various implementations of "blurring" are possible. Examples are blurring or using colored and/or semitransparent overlays.

Optionally, the size of the second user interface section 102 can be reduced to de-focus the second user interface section 102. Thus, more space is available for visualizing other information. Also, a user puts less focus on the second user interface section 102, as it is smaller and less visible.

As already mentioned, the device 100 optionally may comprise a third user interface section 201. The device 100 optionally can be configured to increase the size of the third user interface section 201 to de-focus the second user interface section 102. For example, if the parameter, which is input in the first user interface section 101, relates to the third user interface section 201, the size of the third user interface section is increased so that more space is available e.g., for visualizing the changes which the parameter causes on the measurement result displayed in the third user interface section 201.

As it is illustrated in FIG. 2, the device 100 optionally may comprise a fourth user interface section 202. The device 100 may increase the size of the fourth user interface section 202 to de-focus the second user interface section 102. Although the fourth user interface section 202 is not the interface section on which the user should focus, the size of the fourth user interface section 202 is increased to ensure a consistent distribution of user interface sections across the overall screen. In FIG. 2 the fourth user interface section 202 is also illustrated in a blurred manner, as in this example, the user should not focus on this section.

As shown in FIG. 2, at least two of the user interface sections 101, 102, 201, 202, 203 optionally can be non-rectangular user interface sections 202, 203. The device 100 thus can adapt the interface sections to a predefined use case, e.g., to adjust the shape of a section to a shape of displayed content, or to make optimal use of space.

In FIG. 2, also a fifth user interface section 203 is shown. In this example, the section is of non-rectangular and is not blurred. For example, the parameter which is adjusted in the first user interface section 101 affects the signal shown in the third user interface section 201, and affects information which is displayed in the fifth user interface section 203. The content of the fifth user interface section 203 is not shown in FIG. 2.

In particular, the device 100 may de-focus the second user interface section 102 displaying a measurement result with respect to the first user interface section 101 displaying an instrument parameter based on the selection of the instrument parameter in the first user interface section 101. That is, in a specific use case, the second user interface section 102 displays a measurement result, and the first user interface section 101 displays an instrument parameter.

In other words, FIG. 2 may show a display unit of a device (e.g., a measurement device). However, the corresponding teaching could apply to any graphical user interface of any display unit of any device.

The display unit can be divided into several areas, e.g., the third user interface section 201, the second user interface section 102, the fourth user interface section 202, the fifth user interface section 203 and a sixth user interface section 204. The content of these user interface sections may depend on settings that are adjusted in the first user interface section 101 and e.g., further settings that are not shown. In the following, the terms first user interface section 101 and dialog 101 can be used interchangeably.

The user interface sections can be rectangular, but also can be shaped differently.

For example, the second to fifth user interface section could contain result representations comprising at least one of: a diagram, a grid line, a label, a measurement curve, a waveform, a signal.

The sixth user interface section 204 could, for example, show status information and important setting parameters (i.e. no measurement results).

Different (measuring) applications could run in the background and deliver results, each of which is corresponding to one of the second to fifth user interface section.

In the third user interface section 201, results that originate exclusively from measurement application A could be displayed. In the second user interface section 102, results of application B and application C could be shown.

Device settings that apply to all measurement applications can be displayed in the sixth user interface section 204 (which e.g., is a global section).

A user can now open a (settings) dialog 101, e.g., by clicking. This dialog corresponds to the first user interface section 101.

The first user interface section 101 in FIG. 2 shows such a dialog which is already opened.

The size of the dialog 101 is not limited to the area of the third user interface section 201, although it corresponds to the measurement application A which is assigned to the third user interface section 201.

This is useful, as several (result) areas are displayed on e.g., a screen of a device 100, but dialogs should still be displayed large (e.g., that there are sufficiently large buttons for touchscreen operation).

If e.g., the second user interface section 102 and the fourth user interface section were not blurred and the fifth user interface section 203 was not reduced in size, it would not be obvious to the user to which area or which (measurement) application the dialog 101 belongs.

The dialog 101 contains two parameters that can be set, one input field with the label "Parameter" and a slider.

To put the user focus on the user interface sections which are affected by the input on in the dialog 101, alternatively, the relevant user interface sections 201 and 203 could be enlarged (e.g., zoomed) and the sections 102 and 202 could be reduced in size or disappear. Thereby, relevant areas are shown in sharp focus and irrelevant areas are made unrecognizable. Thus, a customer may recognize what is currently (in the current operating context) important. As soon as the dialog 101 is open (or has focus), relevant user interface sections (here 201 and 203) are displayed normally.

In another embodiment, multiple dialogs 101 (e.g., hierarchies) could be displayed. Then the dialog 101 that has focus is decisive for which user interface sections are de-focused.

A user interface section e.g., is relevant if it has a connection or relation with something that can be influenced by the dialog 101. For example, changing the parameter in user interface section 101 could affect user interface sections 201 and 203.

A user should therefore pay attention to areas 201 and 203 and can safely ignore areas 102, 202 and 204. These areas can be made unrecognizable (blurred) so that the user is not distracted by them.

In a further (alternative) version, the customer operates the slider in dialog 101. Now all user interface sections are blurred, which cannot be influenced by the slider operation.

It also makes sense that the user has the option of placing the dialog 101 (e.g., by dragging it) freely on the screen. If the dialog 101 is closed or loses focus (e.g. by clicking outside the dialog 101 or clicking "X" for closing the dialog 101), the blur disappears.

Similarly, as focus moves from one parameter to another (e.g., from the parameter input field to the slider), the out-of-focus areas can be adjusted accordingly.

Figure 3:
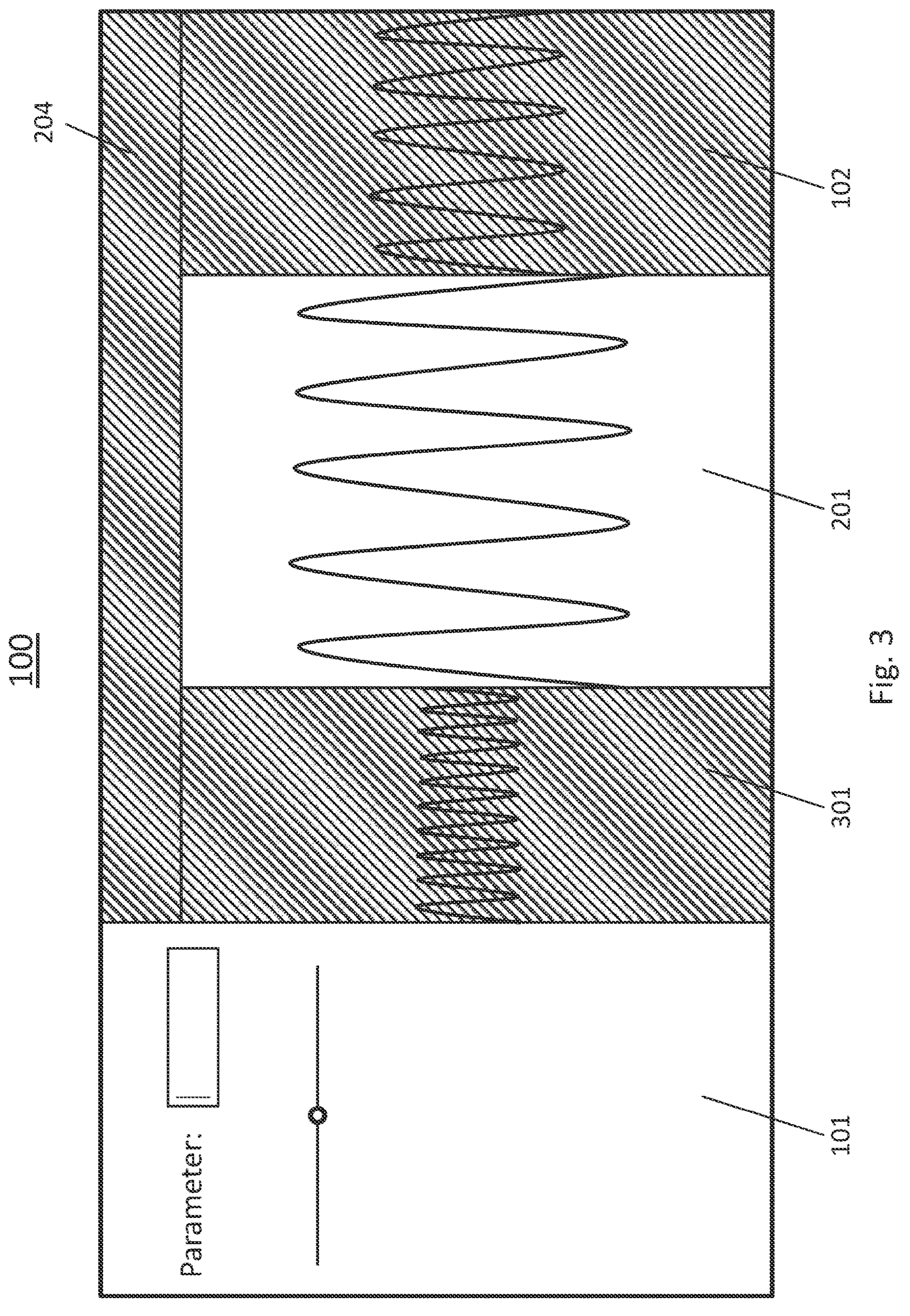
FIG. 3 shows a schematic view of a device according to another embodiment of the present invention.

FIG. 3 shows another example of the device 100. The device 100 of FIG. 3 includes all functions and features of the device 100 as described in view of FIG. 1 and FIG. 2 above.

A screen of the device 100 illustrated in FIG. 3 shows a settings area (i.e., the first user interface section 101, which can also be called dialog 101), and display areas 102, 201 and 301 (i.e. the second user interface section 102, the third user interface section 201 and a further user interface section 301), as well as a status area 204 (i.e., the sixth user interface section 204).

Unlike before, the dialogue 101 does not cover any other user interface sections. That is, for the operating principle described in this document, it may be not relevant, where the dialog 101 is and how big it is.

The screen layout of the device 100 could also change dynamically (e.g., areas can become larger, smaller, or disappear depending on a user interaction).

Also, in the example shown in FIG. 3, those user interface sections 102, 204, 301 which are not related to the parameter which is adjusted in the dialog 101 can be blurred or reduced in size.

Figure 4:
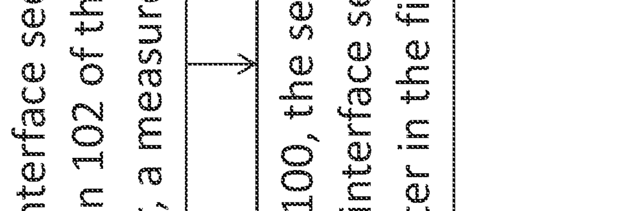
FIG. 4 shows a schematic view of a method according to an embodiment of the present invention.

FIG. 4 schematically shows a method 400 according to an embodiment of the present invention. The method is for emphasizing the relation of user interface sections 101, 102. The method 400 comprises a step of displaying 401, by a first user interface section 101 of a device 100 and a second user interface section 102 of the device 100, at least one of: an instrument parameter, a measurement result, a waveform. The method comprises another step of de-focusing 402, by the device 100, the second user interface section 102 with respect to the first user interface section 101 based on the selection of an instrument parameter in the first user interface section 101.

It is important to note that the inventive device and method very closely correspond. Therefore, all the above said regarding the device is also applicable to the method. Everything which is described in the description and/or claimed in the claims and/or drawn in the drawings can be combined.

The invention is not limited to the illustrated embodiment. The network devices may be mobile terminals such as mobile phones, but also computers such as personal computers or the like. All features described above, or features shown in the figures can be combined with each other in any advantageous manner within the scope of the invention.

The invention claimed is:

1. A device for emphasizing the relation of user interface sections, the device comprising:

a first user interface section;

a second user interface section; and a de-focus or blur mechanism that is conditional on whether the content in a user interface section is affected by the selected parameter;

wherein the first user interface section and the second user interface section are configured to display at least one of: an instrument parameter, a measurement result, a waveform;

wherein the device is configured to de-focus the second user interface section with respect to the first user interface section based on the selection of an instrument parameter in the first user interface section;

wherein the device is further configured to blur the second user interface section to de-focus the second user interface section, and the blur disappears if the first user interface section loses focus, and wherein upon an instrument parameter in the first user interface section is selected, the second user interface section, which shows a measurement result or a waveform that is not affected by the instrument parameter, is de-focused.

2. The device according to claim 1, further configured to reduce the size of the second user interface section to de-focus the second user interface section.

3. The device according to claim 1, further comprising a third user interface section, wherein the device is in particular configured to increase the size of the third user interface section to de-focus the second user interface section.

4. The device according to claim 1, further comprising a fourth user interface section, wherein the device is in particular configured to increase the size of the fourth user interface section to de-focus the second user interface section.

5. The device according to claim 1, wherein at least two of the user interface sections are non-rectangular user interface sections.

6. The device according to claim 1, further configured to de-focus the second user interface section displaying a measurement result with respect to the first user interface section displaying an instrument parameter based on the selection of the instrument parameter in the first user interface section.

7. A method for emphasizing the relation of user interface sections of a device, the device comprises a first user interface section, a second user interface section, and a de-focus or blur mechanism that is conditional on whether the content in a user interface section is affected by the selected parameter, the method comprising the steps of:

displaying, by the first user interface section of the device and the second user interface section of the device, at least one of: an instrument parameter, a measurement result, a waveform;

de-focusing, by the device, the second user interface section with respect to the first user interface section based on the selection of an instrument parameter in the first user interface section; and blurring, by the device, the second user interface section to de-focus the second user interface section, wherein the blur disappears if the first user interface section loses focus, wherein upon an instrument parameter in the first user interface section is selected, the second user interface section, which shows a measurement result or a waveform that is not affected by the instrument parameter, is de-focused.

8. The method according to claim 7, further comprising the step of reducing, by the device, the size of the second user interface section to de-focus the second user interface section.

9. The method according to claim 7, wherein the device further comprises a third user interface section, and wherein the method in particular comprises the step of increasing, by the device, the size of the third user interface section to de-focus the second user interface section.

10. The method according to claim 7, wherein the device further comprises a fourth user interface section, and wherein the method in particular comprises the step of increasing, by the device, the size of the fourth user interface section to de-focus the second user interface section.

11. The method according to claim 7, wherein at least two of the user interface sections are non-rectangular user interface sections.

12. The method according to claim 7, further comprising the step of de-focusing, by the device, the second user interface section displaying a measurement result with respect to the first user interface section displaying an instrument parameter based on the selection of the instrument parameter in the first user interface section.

13. A computer program comprising instructions which, when the program is executed by a computer, cause the computer to carry out the method according to claim 7.

* * * * *